(12) United States Patent
Forster et al.

(10) Patent No.: US 7,156,224 B2
(45) Date of Patent: Jan. 2, 2007

(54) CIRCULATING MECHANISM, AND METHOD OF OPERATING SUCH A CIRCULATING MECHANISM

(75) Inventors: Gerhard Forster, Schwarzenbruck (DE); Jens Hamann, Fürth (DE); Dietmar Stoiber, Fürth (DE); Bernd Wedel, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 238 days.

(21) Appl. No.: 10/850,555

(22) Filed: May 20, 2004

(65) Prior Publication Data

US 2004/0262131 A1    Dec. 30, 2004

(30) Foreign Application Priority Data

May 23, 2003    (DE) ................. 103 23 910

(51) Int. Cl.
*B65G 17/00* (2006.01)
(52) U.S. Cl. ............... 198/837; 198/838; 198/841; 198/845; 198/594
(58) Field of Classification Search ........... 198/837, 198/838, 841, 845, 800, 594
See application file for complete search history.

(56) References Cited

U.S. PATENT DOCUMENTS

| | | | | |
|---|---|---|---|---|
| 3,669,238 A | * | 6/1972 | Folkes et al. ............... 198/805 |
| 3,858,710 A | * | 1/1975 | Spodig .................... 198/690.1 |
| 4,609,099 A | * | 9/1986 | Pentith .................... 198/833 |
| 4,823,939 A | * | 4/1989 | Langhans et al. ........... 198/805 |
| 4,860,881 A | * | 8/1989 | Sticht .................... 198/443 |
| 5,088,593 A | * | 2/1992 | Lewin .................... 198/619 |
| 5,127,515 A | * | 7/1992 | Damkjaer ................. 198/831 |
| 6,085,896 A | * | 7/2000 | van Zijderveld ............ 198/841 |
| 6,510,941 B1 | * | 1/2003 | Schermutzki et al. ..... 198/836.1 |
| 6,957,734 B1 | * | 10/2005 | Imai et al. ............... 198/472.1 |
| 6,962,249 B1 | * | 11/2005 | Ludwig et al. .......... 198/345.3 |

FOREIGN PATENT DOCUMENTS

| | | |
|---|---|---|
| DE | 863 324 B | 11/1952 |
| DE | 78 18 570 U1 | 1/1979 |
| DE | 33 23 344 C2 | 1/1985 |
| DE | 35 30 075 A1 | 4/1986 |
| DE | 87 14 840 U1 | 3/1988 |
| DE | 197 34 357 C2 | 2/1999 |
| DE | 200 19 316 U1 | 4/2001 |
| DE | 100 09 331 A1 | 9/2001 |
| DE | 698 04 072 T2 | 10/2002 |
| DE | 698 11 448 T2 | 7/2003 |

* cited by examiner

*Primary Examiner*—Douglas Hess
(74) *Attorney, Agent, or Firm*—Henry M. Feiereisen

(57) ABSTRACT

A circulating mechanism includes a moving member, e.g. a chain or a belt, which travels along a circulating path and is looped about at least one deflecting member for reversing a travel direction of the moving member. Disposed in a section of the circulating path is a guide assembly for guiding the moving member. A magnetic field generating device is provided for applying a magnetic force upon the moving member at least in an area of the guide assembly so as to draw the moving member against the guide assembly and thereby enhance the travel behavior of the moving member.

27 Claims, 8 Drawing Sheets

CIRCULATING MECHANISM, AND METHOD OF OPERATING SUCH A CIRCULATING MECHANISM

CROSS-REFERENCES TO RELATED APPLICATIONS

This application claims the priority of German Patent Application, Serial No. 103 23 910.3, filed May 23, 2003, pursuant to 35 U.S.C. 119(a)–(d), the disclosure of which is incorporated herein by reference.

BACKGROUND OF THE INVENTION

The present invention relates, in general, to a circulating mechanism such a circulating chain mechanism or circulating belt mechanism, and to a method of operating such a circulating mechanism.

Circulating mechanisms of a type involved here include a moving member, such as for example a transport chain or transport belt, which is moved about a circulating path that is oftentimes split into two path portions whereby the path portions form in particular components of a machine frame. By splitting the circulating path, the moving member can be mechanically tensioned. In case of a circulating chain mechanism, tensioning is normally implemented by using a spring force to urge the path portions of the circulating path against one another so that the chain, which is looped about the path portions and composed of plural chain links, becomes taut. As a consequence, also the chain links of the chain are tensioned. The chain links of the chain may hereby be configured in the form of chain carriages having guide wheels. As the chain is maintained under tension by the spring action, the chain is subjected to vibrations or oscillations that strain the chain and cause wear which adversely affects also parts of the circulating chain mechanism. The chain and its guidance are subjected to shocks and vibrations in particular in the transition zone between the path portions of the circulating path, causing noise and significant wear.

It would therefore be desirable and advantageous to provide an improved circulating mechanism to obviate prior art shortcomings.

SUMMARY OF THE INVENTION

According to one aspect of the present invention, a circulating mechanism includes a moving member traveling along a circulating path and looped about at least one deflecting member for reversing a travel direction of the moving member, a guide assembly disposed in a section of the circulating path for guiding the moving member, and a magnetic field generating device for applying a magnetic force upon the moving member at least in an area of the guide assembly.

The present invention resolves prior art problems by providing the circulating mechanism with a magnetic field generating device by which the moving member, e.g. a chain or a belt, is drawn to and bears upon the guide assembly. As a result, the guide assembly is able to guide the moving member along a path while the moving member circulates. In the event the moving member includes guide wheels and the guide wheels roll on the guide assembly, the magnetic field generating device provides a connection at all times between the guide wheels of the moving member and the guide assembly.

When the moving member is a chain comprised of plural chain links, the magnetic field generating device is able to influence at least some or all chain links by a magnetic field and a magnetic force. Hereby, the magnetic field generating device may be realized by magnetized material that is integrated in the chain links. Examples of magnetizable material include a permanent magnet or a remagnetizable material, i.e. soft-magnetic material, such as ferrous material, which can be magnetized and has a slight coercive force and which looses a substantial part of magnetization, once the magnetic field is removed. In other words, a material with slight remanence.

The advantageous effect of the magnetic field can be realized through repulsive action as well as attractive action of the magnetic field. When using repulsive action, the chain includes, e.g. a permanent magnet or an electromagnet which has a magnetic field that opposes a further magnetic field. The repulsion pushes hereby the chain against the guide assembly.

According to another feature of the present invention, the magnetic field generating device applies a force upon the chain to urge the chain against the guide assembly. The magnetic field generating device may hereby be a permanent magnet or electromagnet, and represent a part that is separate from the chain whereby the magnetic field travels across the chain.

A circulating mechanism according to the present invention is cost-efficient to manufacture when the chain includes a magnetic material which is remagnetizable, and thus has a slight coercive force and small remanence, such as soft-magnetic ferrous material, and when a magnetic field is generated which does not have to interact with another magnetic field to produce a magnetic force. Shocks, vibrations and excessive wear are eliminated or at least significantly reduced by the magnetic attraction of individual chain links against the guide assembly which forms a guide path. The provision of the magnetic field generating device is also advantageous in connection with a mechanical play between individual chain links of a chain. Even, when encountering such a mechanical play between individual chain links, the chain can no longer detach from the guide assembly. The guide assembly may extend over single portions of the circulating path, or over several portions, or over the entire circulating chain path. As the chain links of the chain are pressed individually against the guide assembly through magnetic force and thus can no longer detach from the guide assembly, it is no longer necessary to mechanically maintain the chain under tension on its circulating path, or at least the need for re-tensioning the chain mechanism is eliminated. Thus, the circulating mechanism is easier to operate and less complicated to manufacture, thereby reducing overall costs. The circulating chain path can now be made in one piece, thereby eliminating the problem caused by vibrations and arrangement of a tensioning spring.

In particular, when transporting chain mechanisms are involved which operate at high speed of the chain, wear of the chain and the guide assembly is significantly reduced so that replacement thereof is less frequent, resulting in longer operating times and shorter standstill periods.

According to another feature of the present invention, a flux conductor may be provided for directing a magnetic flux of the magnetic field. The flux conductor may hereby be positioned adjacent to an air gap, with the magnetic flux conducted across the air gap. By using one or more flux conductors, which may include remagnetizable ferrous material, the generated magnetic field can be conducted in such a manner as to realize a high magnetic force. The air gap is sized as small as possible and may even approach zero, in which case the flux conductor thus closes the magnetic field without provision of an air gap.

According to another feature of the present invention, the magnetic field generating device may be integrated in the moving member, and/or the magnetic field generating device may be fixed in place in relation to the guide assembly. Integration of the magnetic field generating device in the moving member has the advantage that a magnetic flux is generated and a magnetic force is applied during travel of the moving member over the entire circulating path. Disposing the magnetic field generating device in fixed relation to the guide assembly simplifies installation and does not increase the inertia of the moving member, thereby positively affecting the dynamic behavior of the circulating mechanism.

According to another feature of the present invention, the magnetic field generating device may be disposed in an area of the deflecting member, in particular in an area of an entry zone of the moving member. The guide assembly is subject to wear in particular in the area of the deflecting member or entry zone which is further increased when the deflecting member, also called chain wheel head in the event of a chain as moving member, is resiliently supported by a portion of the machine frame. In this case, the resilient deflecting member has several vibrations modes. The resilient construction, heretofore required to tension the chain, results between the deflecting member and the machine frame in a jointed area which excites additional vibrations.

In accordance with the present invention, pretensioning of the moving member, e.g. by a spring, can be omitted when the moving member is tensioned electrically. As a consequence, the deflecting member, i.e. chain wheel head, can be securely fixed to the machine frame. The moving member can be maintained under tension by means of a biasing torque or braking moment for the drive of the deflecting member. Thus, the tendency of the deflecting member to vibrate is reduced to a minimum. Moreover, there is no jointed area between the deflecting member and the machine frame. As a result, the moving member such as a chain, can be held on the circulating path without a single jointed area between the deflecting member and the machine frame. Vibrating or rattling of the chain is thus avoided.

According to another feature of the present invention, the magnetic field generating device may be made of magnetized material, e.g. a permanent magnet, e.g. of hardened carbon steel with high remanence, or an electromagnet which generates a magnetic flux when electric current is applied.

According to another feature of the present invention, the air gap may be made variable in size. In this way, the magnetic force acting upon the moving member can also be varied accordingly. Suitably, a controller is provided to control the size of the air gap in dependence on, e.g., a circulating speed of the moving member. When high speeds are involved, a reduction of the air gap size increases the magnetic force so that the moving member is drawn at all times against the guide assembly despite the increase in centrifugal forces. On the other hand, when the moving member circulates at reduced speed, the air gap can be enlarged to such an extent that the magnetic force is still sufficient to maintain the moving member against the guide assembly. In this way, wear is less as friction is reduced.

According to another aspect of the present invention, a method of guiding a moving member of a circulating mechanism includes the step of applying a magnetic force upon the moving member to thereby draw the moving member to a guide assembly. The moving member may hereby be a chain or a belt. The magnetic force upon the moving member can be controlled by directing the magnetic field across an air gap and varying the size of the air gap in dependence on, e.g., the speed of the moving member.

According to another feature of the present invention, the moving member is maintained under tension electrically, e.g. by a biasing torque or a braking moment, predefined in a control unit of a drive for propelling the deflecting members of the circulating mechanism.

A circulating mechanism according to the present invention, such as a circulating chain mechanism or a circulating belt mechanism, is applicable in a production machine or machine tool having a sensor for ascertaining wear of the moving member and/or guide assembly and/or deflecting member. Such a sensor is, e.g., provided for measuring the magnetic field and includes means for changing the magnetic field in dependence on the extent of wear.

The circulating mechanism in production machines or machine tools is oftentimes propelled by means of an electric drive which can be controlled by power converters to produce a mechanical tension. Thus, the mechanical tension of the moving member can be combined with the magnetic field generating device for guiding the moving member free of wear.

A circulating mechanism according to the present invention is also applicable in a crawler vehicle having a superstructure, and a base for supporting the superstructure, with the base having a circulating chain mechanism with a chain traveling along a circulating path and looped about at least one deflecting member for reversing a travel direction of the moving member, a guide assembly disposed in a section of the circulating path for guiding the moving member, and a magnetic field generating device for applying a magnetic force upon the moving member at least in an area of the guide assembly. Examples of a crawler vehicle includes construction vehicles, such as a crane, an excavator, a caterpillar, which have a crawler-based drive unit.

Also a robot may be equipped with a circulating chain mechanism according to the present invention for movement. Likewise, armored vehicles or other transport vehicles may be constructed as crawler vehicles, including a bucket wheel excavator or an excavator for transporting brown coal or hard coal.

The use of a circulating chain mechanism in a crawler vehicle reduces vibration, oscillations and wear. This is especially true when high speeds of the chain are involved in view of the improved guidance of the chain so that the chain can be operated at maximum speed. Also, when the crawler vehicle operates a lower speed of the chain, previously experienced problems as a result of dirty chains, statically unbalanced load of the crawler vehicle, or irregularities in the road surface, and leading to oscillations or vibrations can be significantly reduced.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
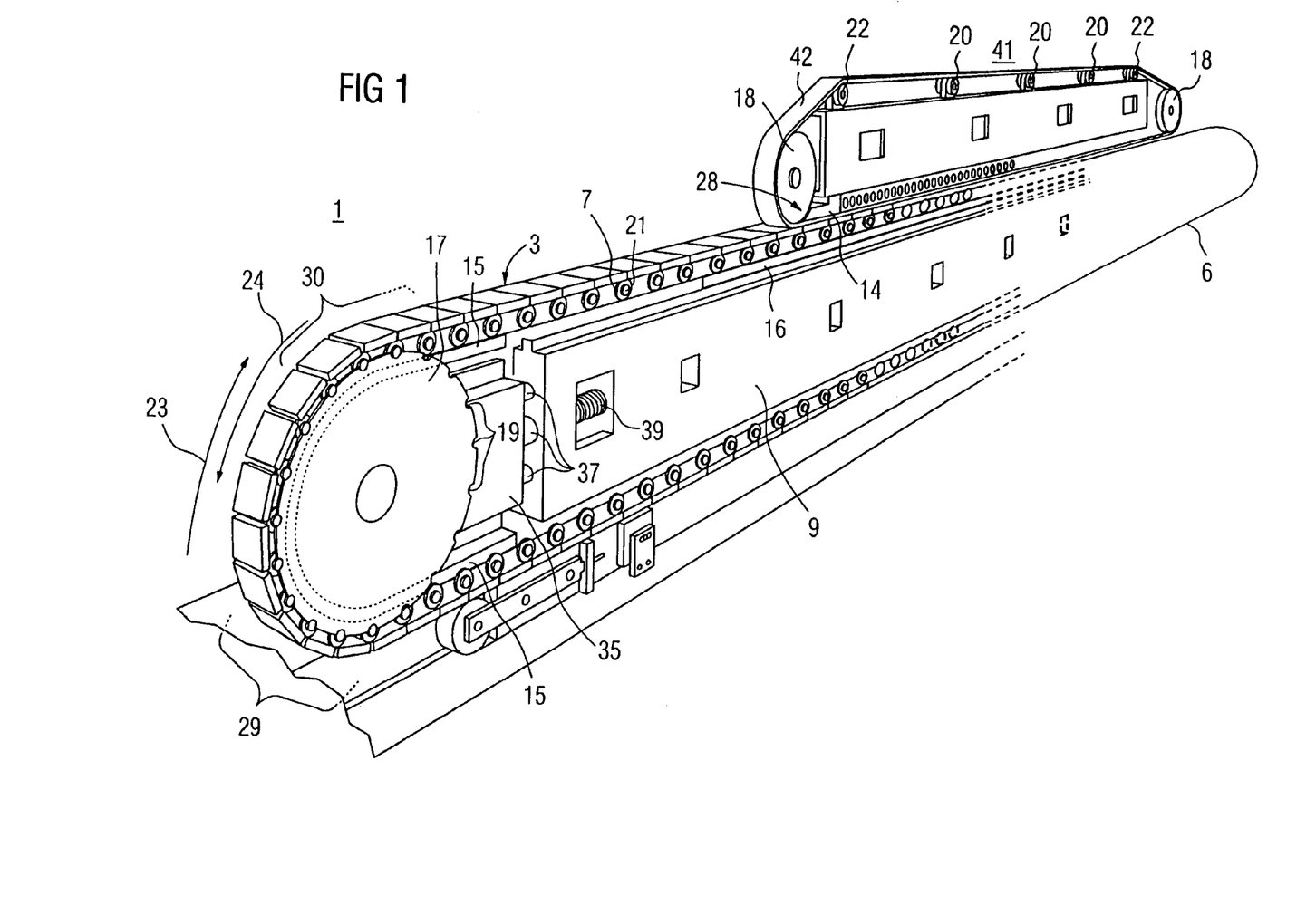
FIG. 1 is a perspective view of a circulating mechanism according to the present invention, constructed in the form of a circulating chain mechanism in combination with a circulating belt mechanism.

Turning now to the drawing, and in particular to FIG. 1, there is shown a perspective view of a circulating mechanism according to the present invention, constructed in the form of a circulating chain mechanism, generally designated by reference numeral 1, in combination with a circulating belt mechanism, generally designated by reference numeral 41. The circulating chain mechanism 1 includes a chain 3 composed of a plurality of interconnected chain links 5. The chain 3 moves about a circulating path 6 which defines a closed loop and is shown in more detail in FIG. 1 only over a section of the circulating chain mechanism 1 for sake of simplicity. The circulating path 6 of the chain 3 is guided about deflecting members 17 on opposite ends of the circulating path 6 (only one deflecting member 17 on the left-hand side is shown in FIG. 1). The deflecting member 17, also referred to as chain wheel head, is formed about its perimeter with grooves 19 for engagement of engagement arms 21 of the chain 3. The chain 3 is guided about guide wheels 7 which include the engagement arms 21 and are guided by guide assemblies 14, 15, 16. The guide assemblies 15, 16 form hereby a track for the guide wheels 7, with the guide assembly 15 having a circular configuration in the area of the deflecting member 17, as indicated by the dashed line.

Figure 2:
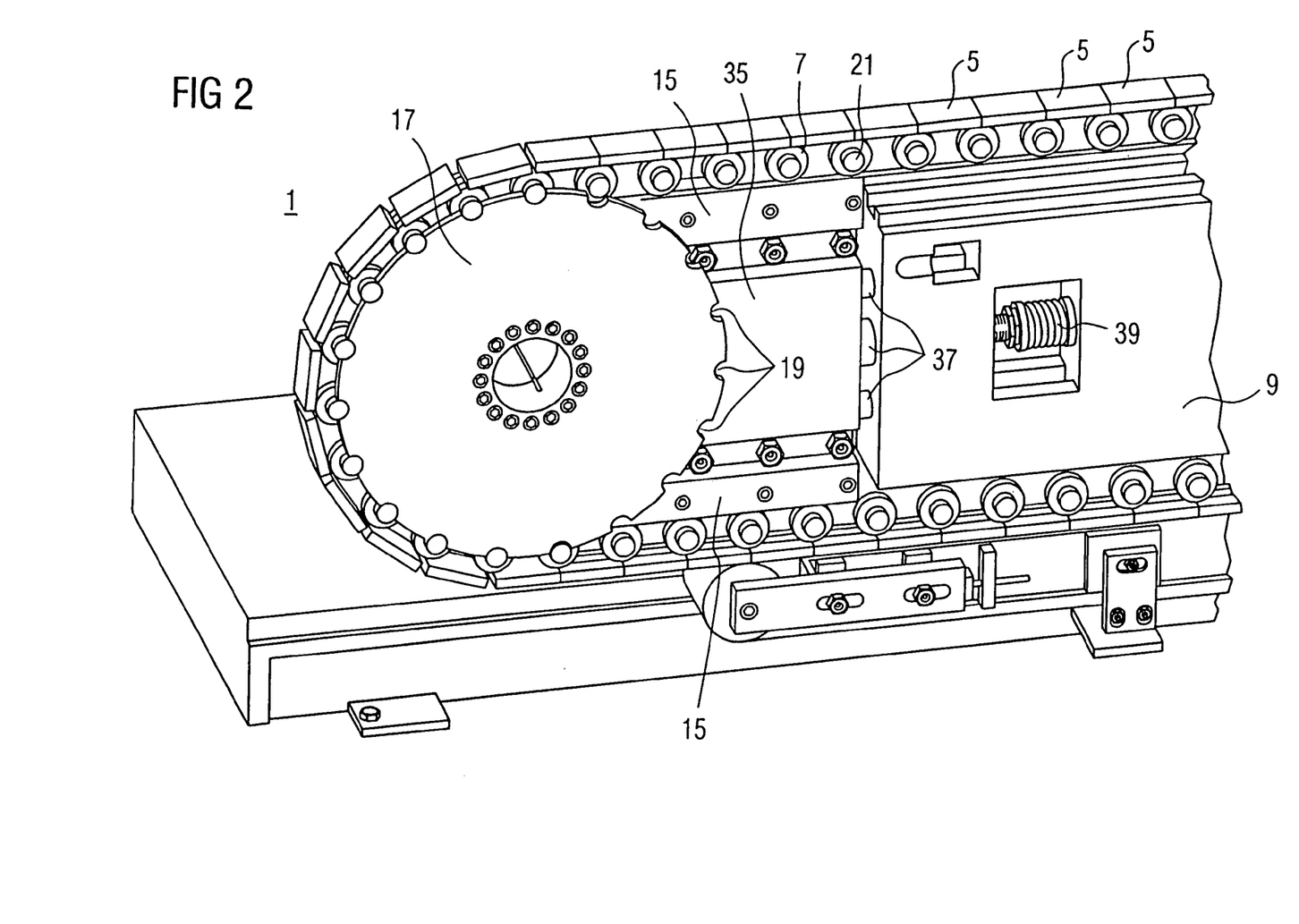
FIG. 2 is a cutaway view in perspective illustration of the circulating chain mechanism of FIG. 1, showing in detail the area of a deflecting member of the circulating chain mechanism.

The deflecting member 17 is rotatably supported by a tensioning member 35 which is connected by cylinders 37 to a machine frame 9. A spring 39 urges the tensioning member 35 via the cylinders 37 in a direction away from the machine frame 9 so that the applied spring force maintains the chain 3 under tension. Depending on the transport direction of the chain 3, as indicated by arrows 23, 24, chain entry and chain exit 29, 30 are defined in the area of the deflecting member 17. The area of the deflecting member 17 is shown in greater detail in FIG. 2, which shows in particular the guide assembly 15 providing a track for the guide wheels 7 with their engagement arms 21.

Although not shown in detail, at least the one of the deflecting members 17, which is securely fixed to the machine frame 9, is normally propelled electrically while the other deflecting member 17 provides only proper guidance of the chain 3 and is also spring-biased in a direction away from the machine frame 9 to maintain the chain 3 under tension. Of course, it is certainly conceivable to propel more than one of the deflecting members 17.

The circulating chain mechanism 1 and the circulating belt mechanism 41 may be used together to transport therebetween an article (not shown), e.g. a wooden panels for a parquet floor, for precise positioning. The circulating belt mechanism 41 includes a belt 42 which is looped about primary deflecting members 18 on opposite ends and secondary deflecting members 22. At least one of the deflecting members 18 is mechanically connected to a drive, e.g. an electric drive, for propelling the belt 42 which is further guided along its circulating path by guide wheels 20. The guide assembly 14 is hereby also provided to guide the belt 42 so that the belt 42 can easily enter or exit the deflecting member 18 at area 28.

Figure 3:
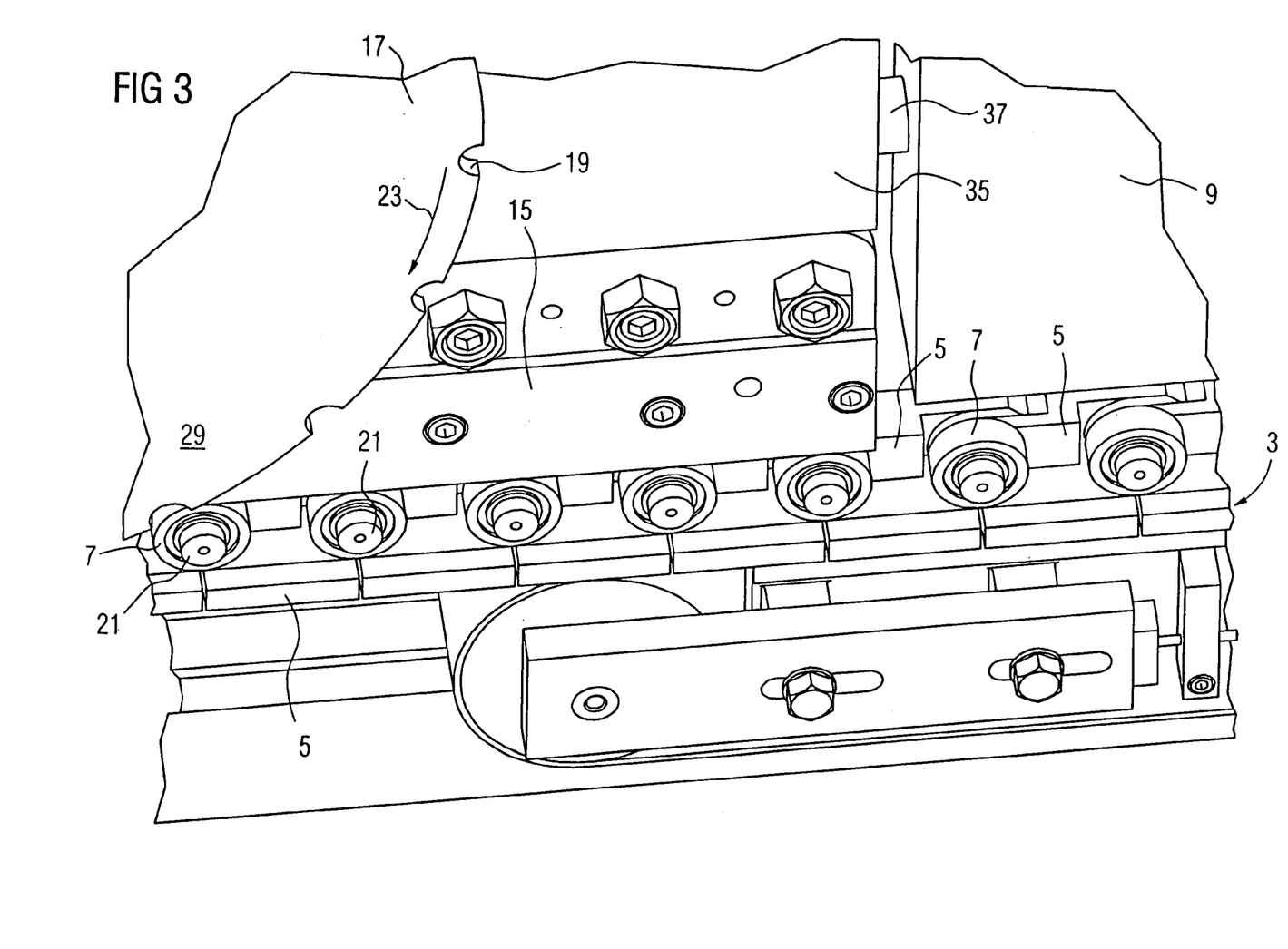
FIG. 3 is a cutaway view in top perspective illustration of the circulating chain mechanism of FIG. 1, showing in detail the area of a guide assembly of the circulating chain mechanism.

FIG. 3 shows in more detail the chain entry zone 29 of the chain 3 into the deflecting member 17, when the chain 3 moves in direction of arrow 23. In addition to the illustration of the interconnected chain links 5, FIG. 3 also illustrates the problem associated to shocks, vibrations and oscillations in the entry zone 29. As a result of the suspension of the tensioning body 35 via the cylinders 37, oscillations and vibrations are encountered in relation to the machine frame 9. Thus, the guide wheels 7 bang against the guide assembly 15, leading to wear. In accordance with the present invention, this problem is addressed and overcome by providing magnets 11, such as permanent magnets or electromagnets and shown e.g. in FIG. 6, in the area of the guide assembly 14 as well as in the area of the guide assemblies 15 and 16 in order to draw the guide wheels 7 and thus the chain 3 and belt 42 through magnetic force against the guide assemblies 14, 15, 16, respectively during their advance. As a consequence, the movement of the chain 3 is relatively quiet and smooth.

Figure 4:
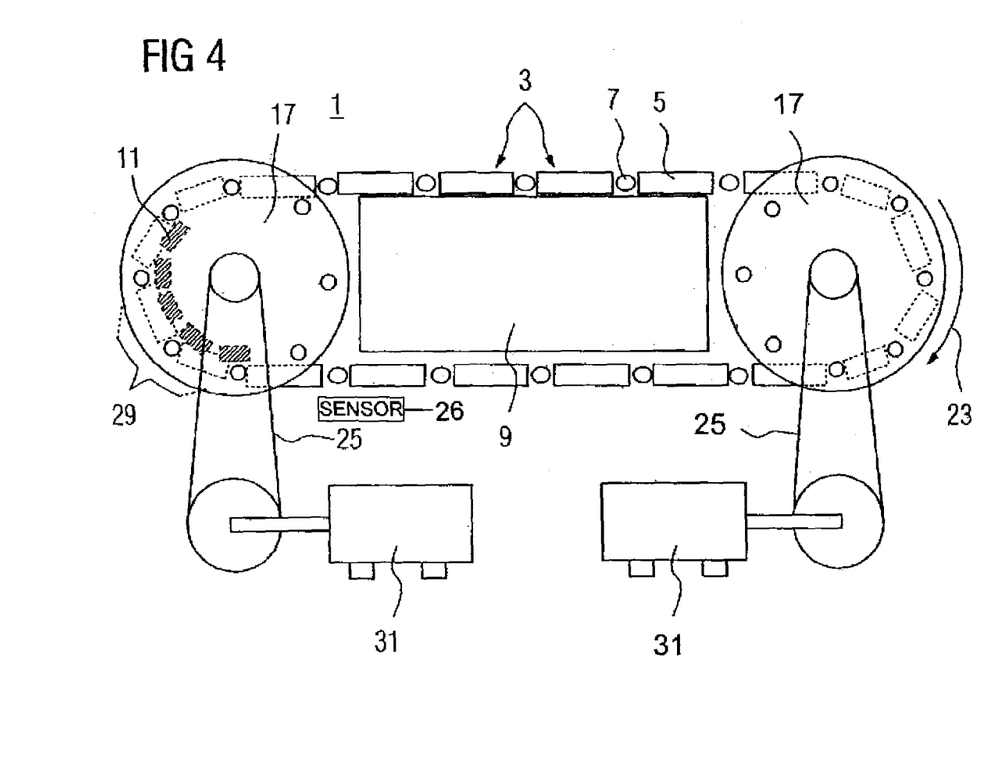
FIG. 4 is a schematic illustration of a modified embodiment of a circulating chain mechanism according to the present invention.

Turning now to FIG. 4, there is shown a schematic illustration a modified embodiment of a circulating chain mechanism 1 according to the present invention, having deflecting members 17 on opposite ends. Parts corresponding with those in FIG. 1 are denoted by identical reference numerals and not explained again. Both deflecting members 17 are propelled here by separate drives which are shown here by way of example only. Each belt drive includes a belt 25 for operatively connecting a motor 31, in particular a controllable electric motor, with the deflecting member 17. As further shown in FIG. 4, a plurality of magnets 11 is disposed in the area of the entry zone 29 along the circular path about the deflecting member 17. The circulating chain mechanism 1 is here of single-piece construction without circulating belt mechanism 41 and without arrangement of spring 39 for maintaining the chain 3 under tension. As a consequence, the problem associated with vibrations and oscillations is eliminated or at least significantly reduced because the need for the tensioning member 35 is also eliminated.

The guide wheels 7 are configured as rollers and maintained by the attractive magnetic force of the magnets 11 on a track defined by the guide assemblies (not shown in FIG. 4) so that the deflecting members 17 can be rotatably connected to the machine frame 9. Thus, there is no need for a jointed area between machine frame 9 and a tensioning member. The magnets 11 assume hereby also the function to maintain the chain 3 under tension so that the need for re-tensioning is eliminated. The positive effect of drawing the chain links 5 to the track further assists the mutual tensioning between the defecting members 17. It is hereby possible to apply a biasing torque upon one of the deflecting members 17 in relation to the other one of the deflecting members 17. As an alternative, it is also possible to bias the other one of the deflecting members 17 by a drive with a predetermined braking moment, or by a brake which executes a braking moment.

As shown in FIG. 4, the magnetic attraction of the guide wheels 7 at the lower chain entry zone 29 draws the chain links 5 (chain carriages) firmly against the guide, thereby preventing bouncing of the chain 3. By making the guides of elastic material, e.g. steel band which is able to absorb the bouncing energy, wear is further reduced.

The circulating chain mechanism as shown in FIG. 4 does not require a manual tensioning of the chain 3 because both deflecting members 17 are securely fixed to the machine frame 9 and the chain 3 is guided about the entire circulating path in the absence of any jointed areas. A sensor, indicated by box 26 and shown here by way of example only, is provided for ascertaining wear of the deflecting member 17. Such a sensor 26 is, e.g., provided for measuring the magnetic field and includes means for changing the magnetic field in dependence on the extent of wear.

Figure 5:
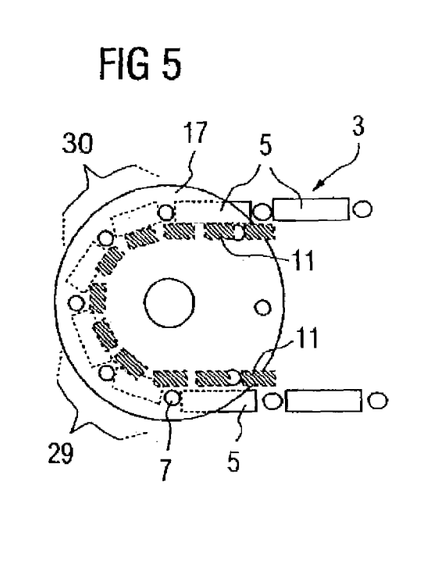
FIG. 5 is a cutaway view of the circulating chain mechanism of FIG. 4 with modified deflecting member.

In FIG. 5, the deflecting member 17, unlike the construction shown in FIG. 4, is provided with magnets 11 in the chain entry zone 29 as well as in the chain exit zone 30 to draw and guide the chain 3 during its advance.

Figure 6:
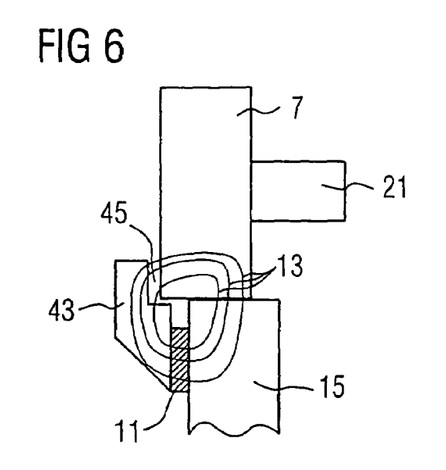
FIG. 6 is a schematic illustration of a circulating chain mechanism according to the present invention depicting the course of a generated magnetic field.

Referring now to FIG. 6, there is shown is a fragmentary schematic illustration of the circulating chain mechanism 1, depicting in detail the pattern of a generated magnetic field in the area of a guide wheel 7 having engagement arm 21 and disposed upon the guide assembly 15. A magnet 11 is positioned at the guide assembly 15. A flux conductor 43 is hereby provided to properly direct the magnetic flux or magnetic field, as shown by magnetic field lines 13, across an air gap 45.

Figure 7:
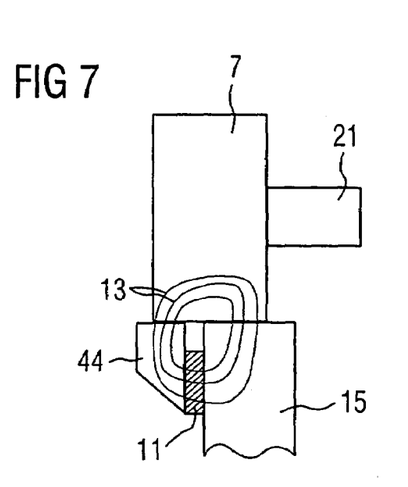
FIG. 7 is a schematic illustration of another circulating chain mechanism according to the present invention depicting the course of a generated magnetic field.

FIG. 7 shows another embodiment of a circulating mechanism according to the present invention which differs from the embodiment of FIG. 6 by providing a flux conductor 44 which is so configured as to provide a running surface for the guide wheel 7 in the absence of an air gap, in addition to the running surface formed by the guide assembly 15.

Figure 8:
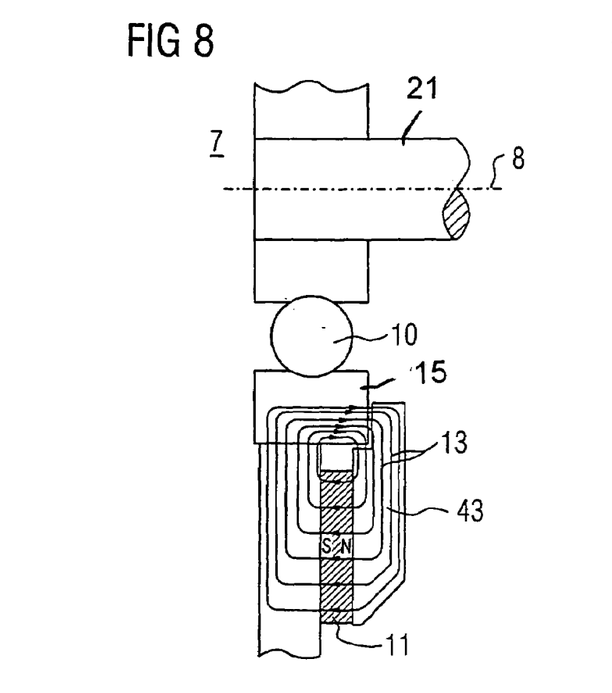
FIG. 8 is a schematic illustration of a guide wheel of a chain link of a circulating chain mechanism according to the present invention.

FIG. 8 shows in more detail the configuration of the guide wheel 7 with engagement arm 21 which defines a wheel axis 8. The magnet 11 is shown here also by the magnetic pole distribution with N designating the north pole and S designating the south pole. Reference numeral 10 designates the bearing for the guide wheel 7 upon the guide assembly 15.

Figure 9:
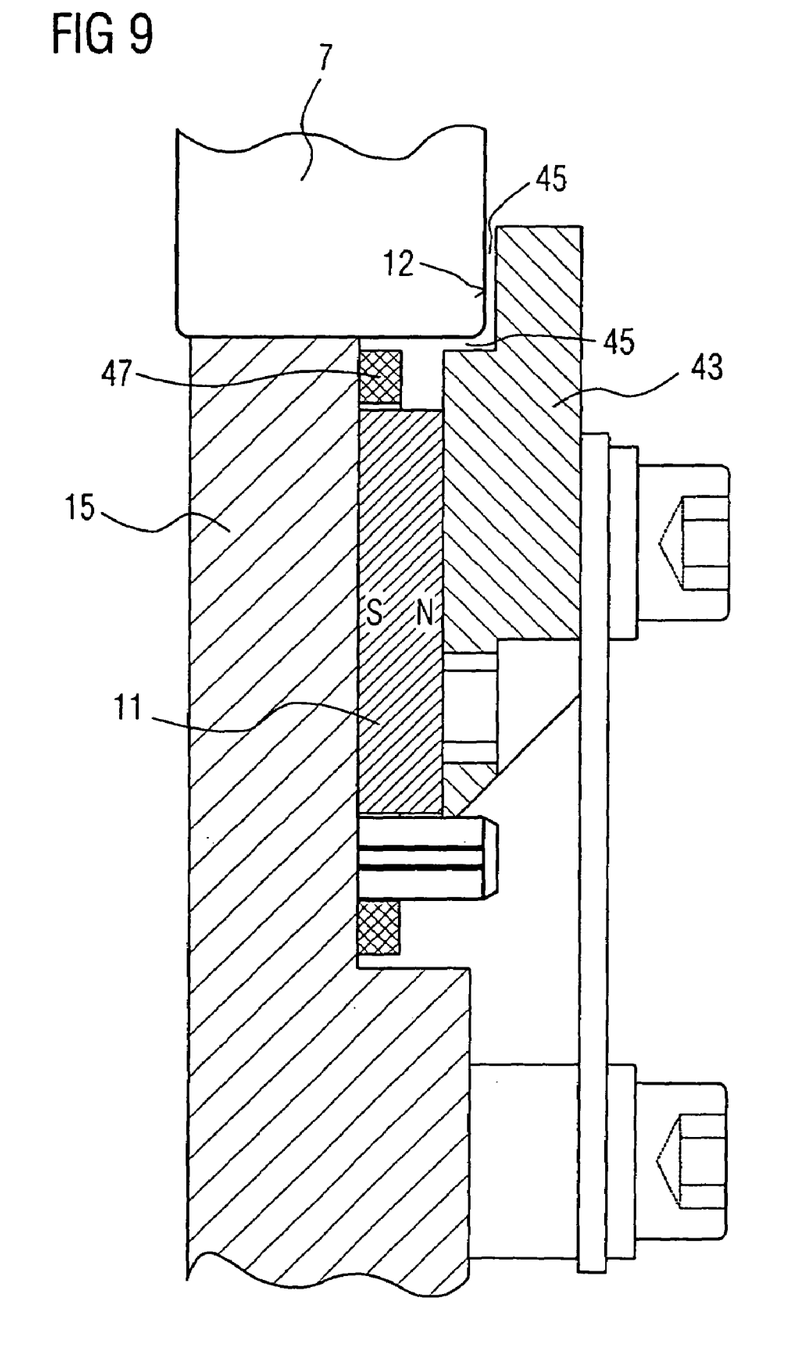
FIG. 9 is a detailed view of an arrangement of a permanent magnet in a circulating chain mechanism according to the present invention.

Referring now to FIG. 9, there is shown the use of a template 47 for proper positioning of magnets 11 in the circulating mechanism 1. The template 47 is configured as expendable template 47 to assist a proper positioning of individual magnets 11, whereby the template 47 may remain in the circulating mechanism after installation of the magnets 11. The magnetic poles may hereby, for example, be aligned in such a manner that the north pole is always directed to the outside. The use of template 47 is desired because poles of same sign repel one another so that the magnets 11 have a tendency to move apart, complicating otherwise the gluing operation for attachment of the magnets 11. The magnetic circuit is so configured that a major part of the width of the running surface of the guide wheel 7 is maintained. Advantageously, the magnetic yoke is shifted substantially to the side surface 12 of the guide wheel 7.

Figure 10:
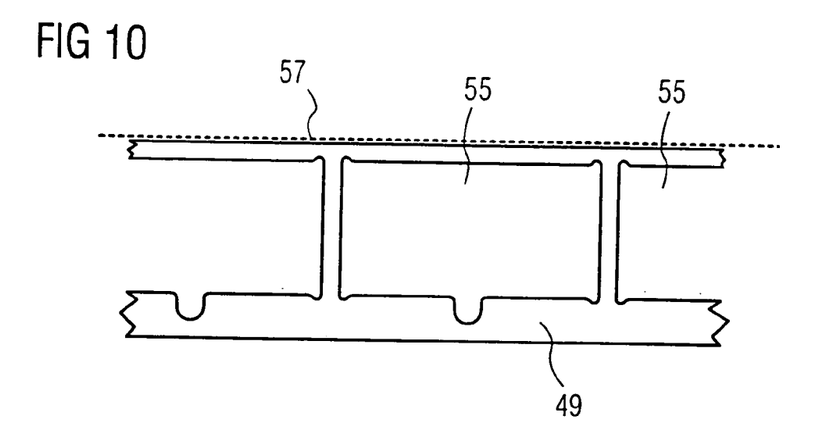
FIG. 10 is a schematic illustration of a template for positioning magnets on a circulating chain mechanism according to the present invention.
Figure 11:
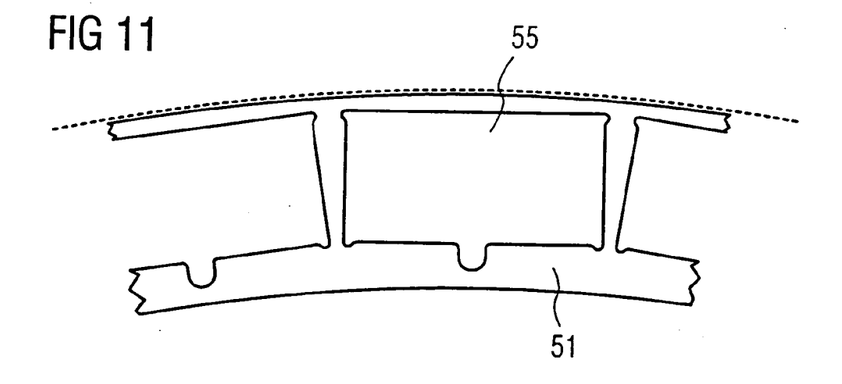
FIG. 11 is a schematic illustration of another template for positioning magnets on a circulating chain mechanism according to the present invention.
Figure 12:
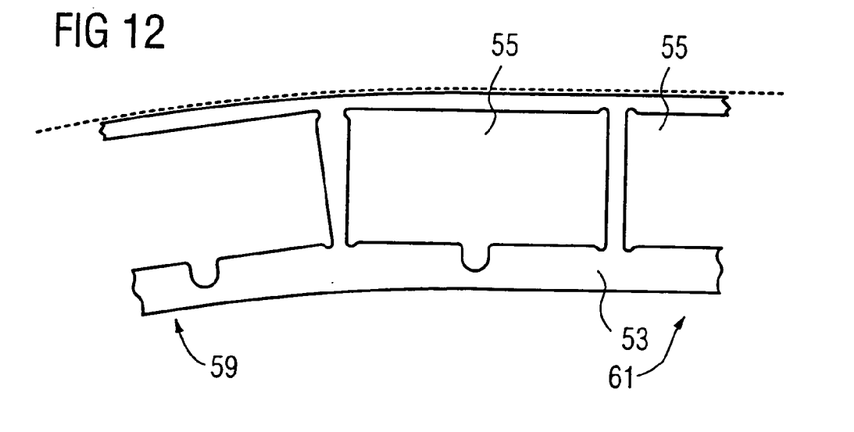
FIG. 12 is a schematic illustration of still another template for positioning magnets on a circulating chain mechanism according to the present invention.

FIG. 10 shows a straight template 49 for use with a guide assembly of straight configuration. The dashed line represents the track 57 for the guide wheels 7. Recesses 55 are provided for receiving the magnets 11. FIG. 11 shows a curved template 51, used in particular for the area of the deflecting members 17, 18. FIG. 12 shows a half-curved template 53 having a curved portion 59 as well as a straight portion 61. The half-curved template 53 is used in particular for the area of the chain entry 29 or belt entry as well as chain exit 30 or belt exit 28. The template 53 may be made of non-magnetic special steel, such as V2a, and has a material thickness of 1.5 mm.

Figure 13:
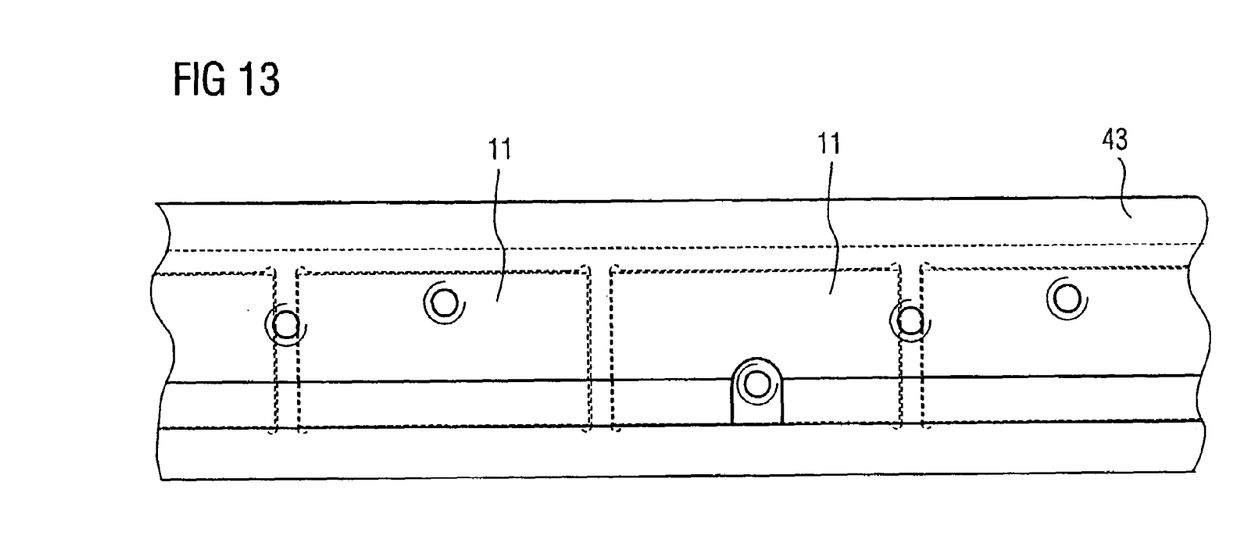
FIG. 13 is a schematic illustration of a flux conductor for a circulating chain mechanism according to the present invention.
Figure 13A:
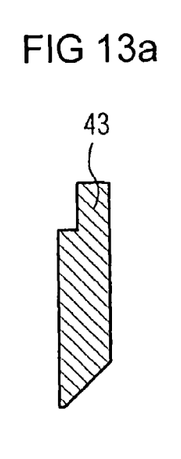
FIG. 13a is a cross sectional view of the flux conductor of FIG. 13.

FIG. 13 shows a schematic longitudinal view of the flux conductor 43 and illustrates the positions of the magnets 11 by dashed line. FIG. 13a shows a cross section of the flux conductor 43.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A circulating mechanism, comprising:
  a moving member traveling along a circulating path and looped about at least one deflecting member for reversing a travel direction of the moving member;
  a guide assembly disposed in a section of the circulating path for guiding the moving member;
  a magnetic field generating means for applying a magnetic force upon the moving member at least in an area of the guide assembly; and
  a flux conductor for directing a magnetic flux of the magnetic field, said flux conductor positioned adjacent an air gap, with the magnetic flux conducted across the air gap.

2. The mechanism of claim 1, wherein the moving member is a chain.

3. The mechanism of claim 1, wherein the magnetic field generating means is so constructed that the force applied upon the moving member urges the moving member against the guide assembly.

4. The circulating mechanism of claim 1, wherein the flux conductor includes remagnetizable ferrous material.

5. The mechanism of claim 1, wherein the magnetic field generating means is stationary in relation to the guide assembly.

6. The mechanism of claim 1, wherein the magnetic field generating means is disposed in an area of the deflecting member.

7. The mechanism of claim 1, wherein the moving member defines an entry zone and an exit zone in relation to the deflecting member, said magnetic field generating means being disposed in an area of the entry zone.

8. The mechanism of claim 1, wherein the magnetic field generating means includes a magnetized material.

9. The mechanism of claim 1, wherein the magnetic field generating means includes an electromagnet.

10. The mechanism of claim 1, wherein the magnetic field generating means includes a permanent magnet.

11. The mechanism of claim 1, wherein the air gap is variable in size.

12. The mechanism of claim 1, further comprising control means for controlling the size of the air gap.

13. The mechanism of claim 1, wherein the moving member is a belt.

14. A circulating mechanism, comprising:
    a moving member traveling along a circulating path and looped about at least one deflecting member for reversing a travel direction of the moving member;
    a guide assembly disposed in a section of the circulating path for guiding the moving member; and
    a magnetic field generating means for applying a magnetic force upon the moving member at least in an area of the guide assembly, wherein the magnetic field generating means is integrated in the moving member.

15. The mechanism of claim 14, wherein the moving member is a chain.

16. The mechanism of claim 14, wherein the magnetic field generating means is so constructed that the force applied upon the moving member urges the moving member against the guide assembly.

17. The mechanism of claim 14, wherein the magnetic field generating means is stationary in relation to the guide assembly.

18. The mechanism of claim 14, wherein the magnetic field generating means is disposed in an area of the deflecting member.

19. The mechanism of claim 14, wherein the moving member defines an entry zone and an exit zone in relation to the deflecting member, said magnetic field generating means being disposed in an area of the entry zone.

20. The mechanism of claim 14, wherein the magnetic field generating means includes a magnetized material.

21. The mechanism of claim 14, wherein the magnetic field generating means includes an electromagnet.

22. The mechanism of claim 14, wherein the magnetic field generating means includes a permanent magnet.

23. The mechanism of claim 14, wherein the moving member is a belt.

24. A production machine or machine tool, comprising:
    a circulating mechanism having a moving member traveling along a circulating path and looped about at least one deflecting member for reversing a travel direction of the moving member, a guide assembly disposed in a section of the circulating path for guiding the moving member, and a magnetic field generating means for applying a magnetic force upon the moving member at least in an area of the guide assembly; and
    a sensor for ascertaining wear of the moving member and/or guide assembly and/or deflecting member.

25. The production machine or machine tool of claim 24, wherein the moving member is a chain or a belt.

26. A production machine or machine tool, comprising:
    a circulating mechanism having a moving member traveling along a circulating path and looped about at least one deflecting member for reversing a travel direction of the moving member, a guide assembly disposed in a section of the circulating path for guiding the moving member, and a magnetic field generating means for applying a magnetic force upon the moving member at least in an area of the guide assembly; and
    an electric tensioning means for maintaining the moving member under tension.

27. The production machine or machine tool of claim 26, wherein the moving member is a chain or a belt.

* * * * *